(12) United States Patent
Huang (10) Patent No.: US 9,829,714 B2
(45) Date of Patent: Nov. 28, 2017

(54) ILLUMINATION MODULE AND DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 383 days.

(21) Appl. No.: 14/798,968

(22) Filed: Jul. 14, 2015

(65) Prior Publication Data

US 2016/0195732 A1 Jul. 7, 2016

(30) Foreign Application Priority Data

Jan. 6, 2015 (TW) .............................. 104100326 A (51) Int. Cl.
*G02B 27/22* (2006.01)
*G02B 27/10* (2006.01)
*G02B 27/14* (2006.01)
*G02B 27/28* (2006.01)

(52) U.S. Cl.
CPC ..... *G02B 27/2235* (2013.01); *G02B 27/1066* (2013.01); *G02B 27/149* (2013.01); *G02B 27/286* (2013.01)

(58) Field of Classification Search
CPC ...... G03B 21/26; G03B 21/28; G03B 21/142; G03B 21/208; G02B 27/26; G02B 27/149; G02B 27/225; G02B 27/286; G02B 27/1066; G02B 27/2235; G02B 13/16; G02B 13/0095; H04N 13/0434; H04N 13/0438; H04N 9/315; H04N 9/3105

See application file for complete search history.

(56) References Cited

U.S. PATENT DOCUMENTS

2002/0057419 A1* 5/2002 Fujimori ................ G03B 21/18
   353/53
2007/0279595 A1* 12/2007 Magarill ................ G03B 21/20
   353/33

* cited by examiner

*Primary Examiner* — Sultan Chowdhury
(74) *Attorney, Agent, or Firm* — Muncy, Geissler, Olds & Lowe, P.C.

(57) ABSTRACT

An illumination module for a display device is disclosed. The illumination module has a principal optical axis. The illumination module includes a light source, an image unit, a beam splitting unit, a first relaying unit and a second relaying unit. The beam splitting unit has a transmitting surface, a first reflective surface and a second reflective surface. The first reflective surface and the second reflective surface are disposed correspondingly to each other. The light source provides light to pass through the image unit and the beam splitting unit in sequence, one portion of the light forms a first light beam, one portion of the light forms a second light beam. The optical axes of the first and second light beams each has an offset with respect to the principal optical axis, and the first offset and the second offset have equivalent scalars and opposite offset directions.

20 Claims, 10 Drawing Sheets

ILLUMINATION MODULE AND DISPLAY DEVICE

CROSS REFERENCE TO RELATED APPLICATIONS

This Non-provisional application claims priority under 35 U.S.C. §119(a) on Patent Application No(s). 104100326 filed in Taiwan, Republic of China on Jan. 6, 2015, the entire contents of which are hereby incorporated by reference.

BACKGROUND

Technical Field

The invention relates to an illumination module, especially to an illumination module of a display device.

Related Art

Recently, the stereo display technology has been vigorously developed and it is applied to a variety of commercial products, such as 3D film, 3D television, and etc. The stereo display technology sends the left eye images and right eye images at different angles of view respectively to the left eye and the right eye of the observer within a time sequence. It mimics the depth of field resulting from the parallax of human eyes for the observer to see the stereo images.

In addition, it can be categorized into glasses type, helmet type and naked eye type stereo display technologies based on the need for additional equipment. Because the naked eye type stereo display technology does not require special stereo glasses or helmet and the observer can watch with naked eyes, the industry particularly values this technology.

The illumination module of the conventional naked eye stereo projection device provides a plurality of images at different angles to form a plurality of fields of vision, so that the observer's left and right eyes receive different images. When the observer is at different locations, he or she will receive different images and see the images at different angles. The practices adopted by general naked eye stereo projection device can be roughly classified into three types: configuring liquid crystal slit, configuring a plurality of projection devices, and collocating with an optical scan element. However, it is complicated to design an optical path for configuring liquid crystal slit, and configuring a plurality of projection devices will cause the whole volume of the display device to become too huge. Therefore, it recently collocates with an optical scan element to form a plurality of light sources to provide stereo images.

Regardless of the practices, it is necessary to cooperate with an angle-magnifying screen (for example double-layer cylindrical lens) for the left and right eyes receive different images. The range of incident angle of the light which the illumination module is illuminating to the screen decides the quantities of the fields of vision which the angle-magnifying screen is able to resolve. The greater the incident angle is, the more the quantities of the resolvable fields of vision are. The range of the incident angle of the light which the illumination module has is restricted to the etendue of itself. The conventional method of increasing etendue usually utilizes increase of imaging area of digital micromirror device. However, as the quantities of fields of vision increase, a digital micromirror device of special standard is required to achieve the desire imaging area, and thus it is not economical.

Therefore, it is an important subject in the field to provide an illumination module and display device of which the quantities of fields of vision are raised by increasing the etendue.

SUMMARY

An objective of the invention is to provide an illumination module and display device so as to raise the quantities of the resolvable fields of vision by increasing etendue.

To achieve the above objective, an illumination module according to the invention is provided for a display device. The illumination module has a principal optical axis. The illumination module includes a light source, an image unit, a beam splitting unit, a first relaying unit and a second relaying unit. The beam splitting unit has a transmitting surface, a first reflective surface and a second reflective surface. The first reflective surface and the second reflective surface are disposed correspondingly to each other.

The light source provides a light. The light passes through the image unit and the beam splitting unit in sequence, one portion of the light forms a first light beam, one portion of the light forms a second light beam. The first light beam is reflected into the first relaying unit by the first reflective surface, the first relaying unit transmits the first light beam to the beam splitting unit, and the first light beam passes through and exits from the beam splitting unit.

The second light beam passes through the beam splitting unit and enters the second relaying unit, the second relaying unit transmits the second light beam to the second reflective surface of the beam splitting unit, and the second light beam is reflected by the second reflective surface and exits from the beam splitting unit.

A first offset exists between a first optical axis of the first light beam and the principal optical axis, a second offset exists between a second optical axis of the second light beam and the principal optical axis, and the first offset and the second offset have equivalent scalars and opposite offset directions.

In one embodiment, the illumination module has an aperture, and the scalars of the first offset and the second offset are equal to the quarter of the aperture.

In one embodiment, the image unit is a digital micromirror device or a LCD device.

In one embodiment, the light source is a laser light source or a laser array.

In one embodiment, the illumination module further includes a polarizing unit. After exiting from the image unit, the light enters the polarizing unit to form horizontally polarized light or vertically polarized light.

In one embodiment, the first relaying unit has a first polarizing element, the first polarizing element has a black stripe mask, a plurality of stripe quarter-wave plates and a reflector. The stripe quarter-wave plates are disposed on the reflector, and the black stripe mask is disposed orthogonally on the stripe quarter-wave plates.

In one embodiment, the first relaying unit has a first polarizing element, the first polarizing element has a black stripe mask, a quarter-wave plate and a reflector, the quarter-wave plate is disposed on the reflector, and the black stripe mask is disposed on the quarter-wave plate.

In one embodiment, the illumination module further includes an optical scan element, the light is transmitted to the image unit by the optical scan element, and the optical scan element deflects according to different time sequences to form a plurality of different images.

In one embodiment, the optical scan element is a voice coil motor, polygon mirror or MEMS (microelectromechanical systems) lens.

In one embodiment, the beam splitting unit further includes a first prism, a second prism and a third prism. The first prism forms the transmitting surface, the second prism and the third prism are disposed on the transmitting surface of the first prism, the first reflective surface is disposed on one side of the second prism opposite the third prism, and the second reflective surface is disposed on one side of the third prism opposite the second prism.

The invention also provides a display device including a display screen and an illumination module. The illumination module has a light source, an image unit, a beam splitting unit, a first relaying unit and a second relaying unit. The beam splitting unit has a transmitting surface, a first reflective surface and a second reflective surface. The first reflective surface and the second reflective surface are disposed correspondingly to each other.

The light source provides a light. The light passes through the image unit and the beam splitting unit in sequence. One portion of the light forms a first light beam, and one portion of the light forms a second light beam. The first light beam is reflected into the first relaying unit by the first reflective surface, and the first relaying unit transmits the first light beam to the beam splitting unit The second light beam passes through the beam splitting unit and enters the second relaying unit, the second relaying unit transmits the second light beam to the second reflective surface of the beam splitting unit, and the second light beam is reflected by the second reflective surface and exits from the beam splitting unit. A first offset exists between a first optical axis of the first light beam and the principal optical axis, a second offset exists between a second optical axis of the second light beam and the principal optical axis, the first offset and the second offset have equivalent scalars, and the first light beam and the second light beam are transmitted to the display screen by the beam splitting unit.

In one embodiment, the illumination module has an aperture, and the scalars of the first offset and the second offset are equal to the quarter of the aperture.

In one embodiment, the image unit is a digital micromirror device or a LCD device.

In one embodiment, the light source is a laser light source or a laser array.

In one embodiment, the illumination module further includes a polarizing unit. After exiting from the image unit, the light enters the polarizing unit to form horizontally polarized light or vertically polarized light In one embodiment, the first relaying unit has a first polarizing element, the first polarizing element has a black stripe mask, a plurality of stripe quarter-wave plates and a reflector, the stripe quarter-wave plates are disposed on the reflector, and the black stripe mask is disposed orthogonally on the stripe quarter-wave plates.

In one embodiment, the first relaying unit has a first polarizing element, the first polarizing element has a black stripe mask, a quarter-wave plate and a reflector, the quarter-wave plate is disposed on the reflector, and the black stripe mask is disposed on the quarter-wave plate.

In one embodiment, the illumination module further includes an optical scan element. The light is transmitted to the image unit by the optical scan element, and the optical scan element deflects according to different time sequences to form a plurality of different images.

In one embodiment, the optical scan element is a voice coil motor, polygon mirror or MEMS (microelectromechanical systems) lens.

In one embodiment, the beam splitting unit further includes a first prism, a second prism and a third prism. The first prism forms the transmitting surface, the second prism and the third prism are disposed on the transmitting surface of the first prism, the first reflective surface is disposed on one side of the second prism opposite the third prism, and the second reflective surface is disposed on one side of the third prism opposite the second prism.

In one embodiment, the display screen includes a double-layer cylindrical lens. The double-layer cylindrical lens has two cylindrical lens layers and an omnidirectional diffuse plate interposed between the cylindrical lens layers.

In one embodiment, the display screen includes a polarizing unit disposed on the light entrance side of the display screen. The light enters the polarizing unit to form horizontally polarized light or vertically polarized light.

In one embodiment, the display device further includes an angle modulation element. The angle modulation element has a plurality of refractive surfaces made by birefringence material.

In one embodiment, the display device further includes an angle modulation element. The angle modulation element has a polarizer, a plurality of stripe half-wave plates and a serrated prism, the serrated prism has a plurality of refractive surfaces, and each of the refractive surfaces is disposed correspondingly to each of the stripe half-wave plates.

As mentioned above, the illumination module provided by the embodiments can split the light into the first light beam and the second light beam by disposing the first reflective surface on the transmitting surface of the beam splitting unit, and the first light beam and the second light beam respectively enter the first relaying unit and the second relaying unit. The optical axes of the first light beam entering the first relaying unit and the second light beam entering the second relaying unit each has an offset with respect to the principal optical axis. Thus, the angle of the light exiting from the illumination module is raised (etendue is increased). On the condition that the image unit is not modified and an additional image unit is not required, the quantities of the resolvable fields of vision can be increased.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

An illumination module and projection device according to embodiments of the present invention will be apparent from the following detailed description, which proceeds with reference to the accompanying drawings, wherein the same references relate to the same elements.

Figure 1:
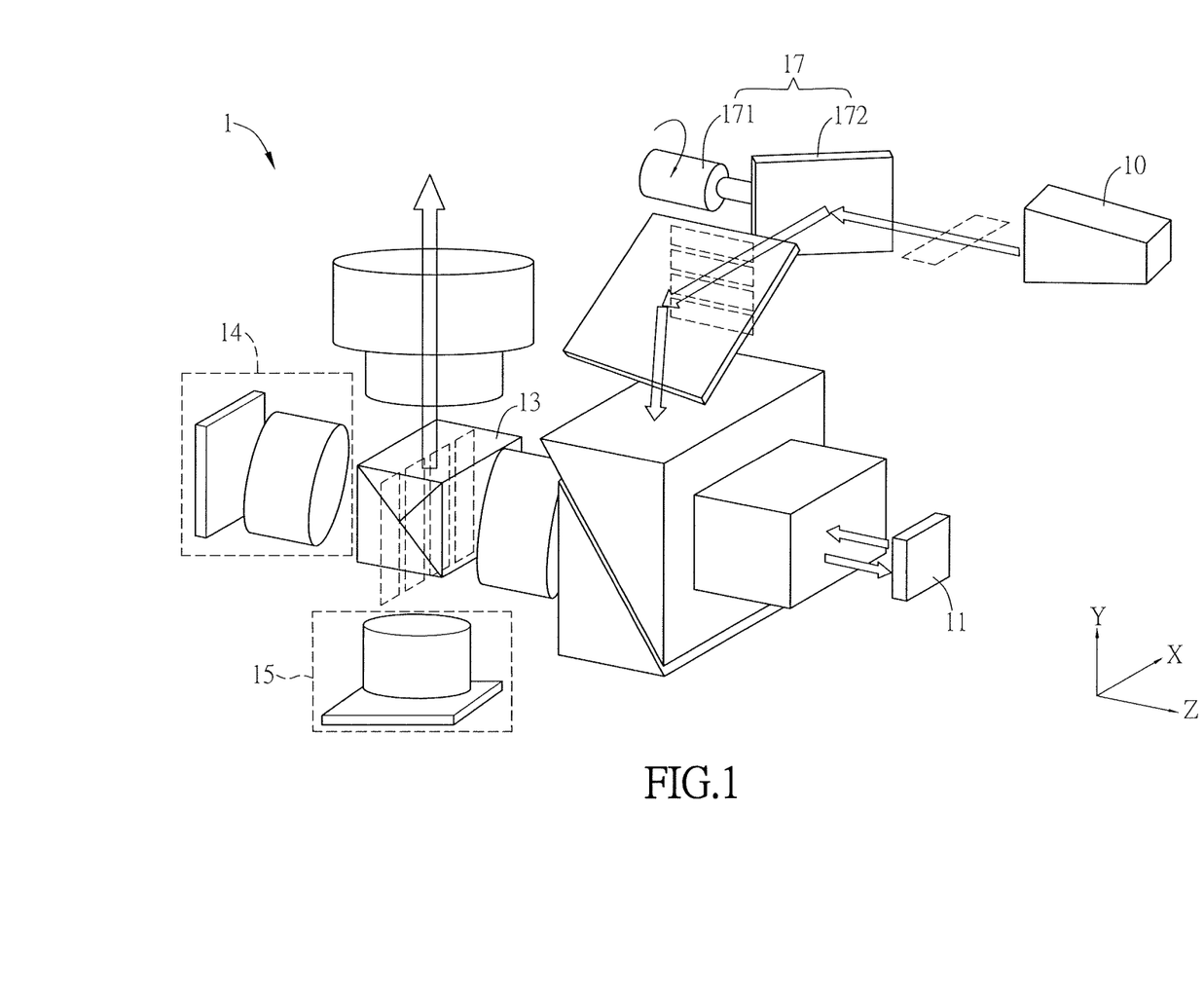
FIG. 1 is a schematic diagram showing an illumination module according to one embodiment.

In the following embodiments and drawings, the elements which are not directly relative to the invention are omitted and not shown. The dimension relationship between each element in the drawings is used for simply understanding, but not used to limit their actual proportion Referring to FIG. 1 to FIG. 3, FIG. 1 is a schematic diagram showing an illumination module according to one embodiment, FIG. 2 is a schematic diagram partially showing the illumination module of FIG. 1, and FIG. 3 is an exploded view showing the beam splitting unit of the illumination module of FIG. 1.

An illumination module 1 for a display device is provided. The display device may be but not limited to DLP (Digital Light Processing), projection display, LCD (Liquid Crystal Display), LCOS System (Liquid Crystal On Silicon System), or device capable of projection displaying.

An illumination module 1 includes a light source 10, an image unit 11, a beam splitting unit 13, a first relaying unit 14 and a second relaying unit 15. The light source 10 can be a laser light source or a laser array. The light source 10 in the embodiment is illustrated as a laser light source, but its quantity and type is not limited to this embodiment. The image unit 11, for example, can be a DMD (digital micromirror device) or a LCD device.

Figure 2:
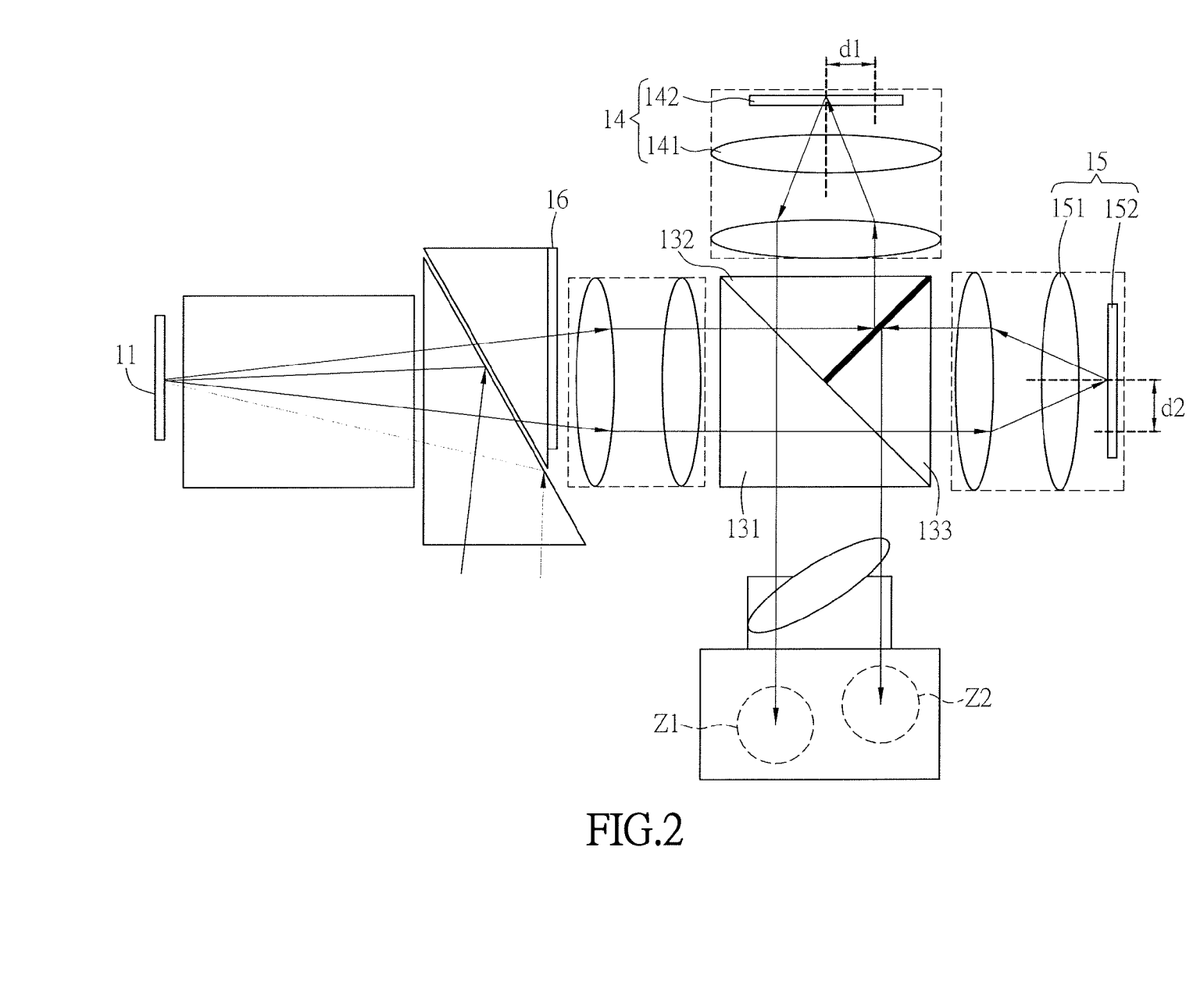
FIG. 2 is a schematic diagram showing partial the illumination module of FIG. 1.
Figure 3:
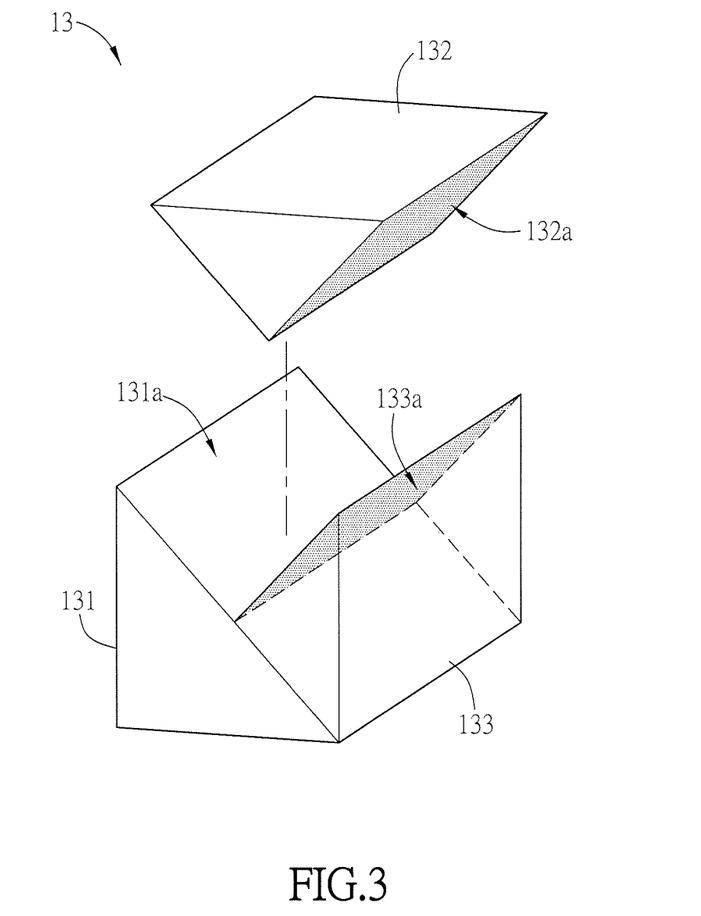
FIG. 3 is an exploded view showing the beam splitting unit of the illumination module of FIG. 1.

Referring to FIG. 2 and FIG. 3, the beam splitting unit 13 in the embodiment has a transmitting surface 131a, a first reflective surface 132a and a second reflective surface 133a. The first reflective surface 132a and the second reflective surface 133a are disposed correspondingly to each other, and the first reflective surface 132a and the second reflective surface 133a are respectively disposed perpendicularly to the transmitting surface 131a. The first reflective surface 132a and the second reflective surface 133a shelter respectively a part of the transmitting surface 131a so that the light which passes through the transmitting surface 131a is partially reflected by the first reflective surface 132a or the second reflective surface 133a.

In detail, the beam splitting unit 13 in the embodiment further includes a first prism 131, a second prism 132 and a third prism 133. The first prism 131 forms the transmitting surface 131a. In the embodiment, the transmitting surface 131a is a light exiting surface of the first prism 131. The second prism 132 and the third prism 133 are disposed on the transmitting surface 131a (light exiting surface) of the first prism 131. The first reflective surface 132a is disposed on one side of the second prism 132 opposite the third prism 133. The second reflective surface 133a is disposed on one side of the third prism 133 opposite the second prism 132. Namely, the first reflective surface 132a is opposite to the second reflective surface 133a. The second prism 132 can split the light, which is transmitted to the beam splitting unit 13, into two light beams.

Besides, referring to FIG. 1 again, the illumination module 1 in the embodiment further includes an optical scan element 17. The light is transmitted to the image unit 11 by the optical scan element 17, and the optical scan element 17 deflects according to different time sequences to foam a plurality of different images. In detail, the reflective surface of the optical scan element 17 deflects according to different time sequences to form images at different angles from light.

The optical scan element 17 in the embodiment can be a voice coil motor, a polygon mirror or a MEMS (microelectromechanical systems) lens, or their combination. Take the voice coil motor as the optical scan element 17 for example, the optical scan element 17 may include an actuation device 171 and a reflective surface 172. The actuation device 171 can drive the reflective surface 172 to deflect. The actuation device 171 can adjust the deflection angle of the reflective surface 172 by adjusting and controlling the current.

In addition, the range of the deflection angle of the reflective surface 172 in the embodiment is from 20° to −20°. If the strip light provided by the light source 10 is projected to form 16 strip light sources at different angles, the deflection angle of the reflective surface can be adjusted with 2.5° each time to form 16 fields of vision. The angle distribution here can be adjusted on demand for the fields of vision; it is not limited to 16.

Therefore, referring to FIG. 1, the optical scan element 17 causes the light provided by the light source 10 from X-Z plane to form a plurality of strip light sources on the Y-Z plane at different time sequences. These strip light sources on the Y-Z plane are transmitted to the image unit 11.

In the embodiment, the illumination module 1 further includes a polarizing unit 16. After exiting from the image unit 11, the light enters the polarizing unit 16 to form horizontally polarized light (p-polarized light) or vertically polarized light (s-polarized light). The polarizing unit 16 in the embodiment is illustrated as a p-polarized plate, and thus the light exiting from the polarizing unit 16 is horizontally polarized light (p-polarized light).

Figure 4A:
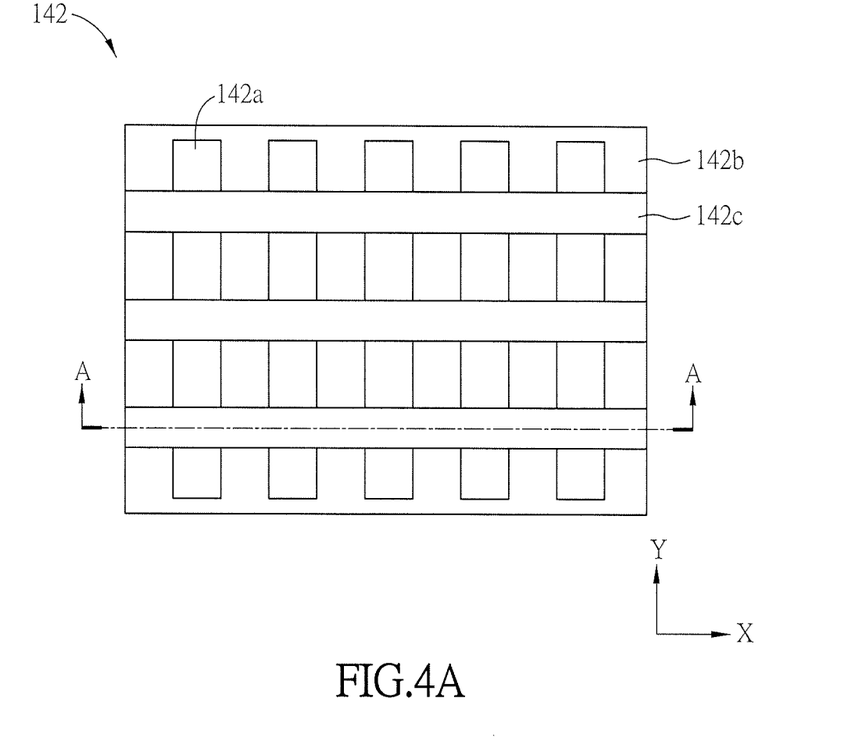
FIG. 4A is a schematic diagram showing the first polarizing element of the first relaying unit.
Figure 4B:
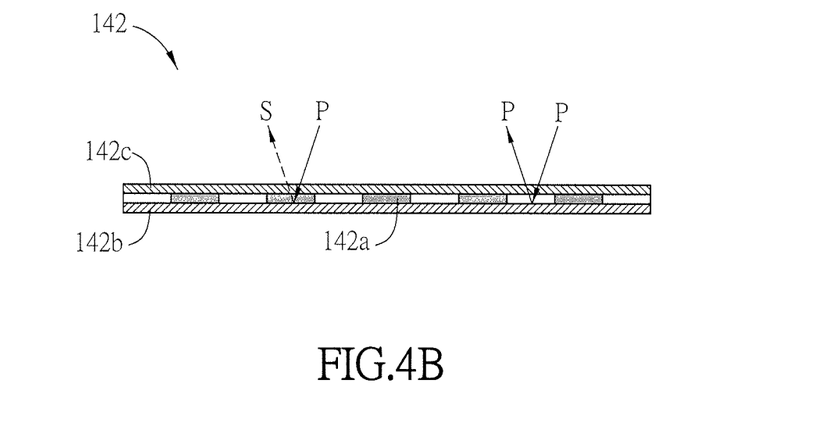
FIG. 4B is a sectional-drawing along cross-section line AA in FIG. 4A.

Then, referring to FIGS. 4A and 4B, they are respectively a perspective view and a lateral schematic diagram of the first polarizing element of the first relaying unit. FIG. 4B is a sectional-drawing along cross-section line AA in FIG. 4A. FIG. 4B and FIG. 4A are simply illustrated, and theirs component size, quantity, shape are simplified but not limited to the present embodiment.

In the embodiment, the first relaying unit 14 has a plurality of lens 141 and a first polarizing element 142. The lens 141 can be converging lens to transmit light to the first polarizing element 142. The first polarizing element 142 at least has a plurality of stripe quarter-wave plates 142a, a reflector 142b and a black stripe mask 142c. The stripe quarter-wave plates 142a are disposed on the reflector 142b. The black stripe mask 142c is disposed orthogonally on the stripe quarter-wave plates 142a. The black stripe mask 142c is a light shielding element formed by a plurality of black stripe plates which are disposed between pixels to shield or absorb unnecessary light to improve contrast ratio of the whole image. For example, during manufacturing, a plurality of the stripe quarter-wave plates 142a are attached to one side of the substrate (not shown in the figures), and the black stripe mask 142c is directly transfer printed on the other side of the substrate. The first reflector 142b is disposed on the other side of the stripe quarter-wave plates 142a.

The arrangement of the second relaying unit 15 is similar to that of the first relaying unit 14, but the arranged location of the black stripe mask of the second relaying unit 15 is distinct from the arranged location of the black stripe mask of the first relaying unit 14. For example, the black stripe mask of the first relaying unit 14 is arranged at odd columns, and then the black stripe mask of the second relaying unit 15 is arranged at even columns, and vice versa. Except the distinct arranged locations of the black stripe masks, other elements and arrangement of elements are similar, they are not repeated here.

Figure 4C:
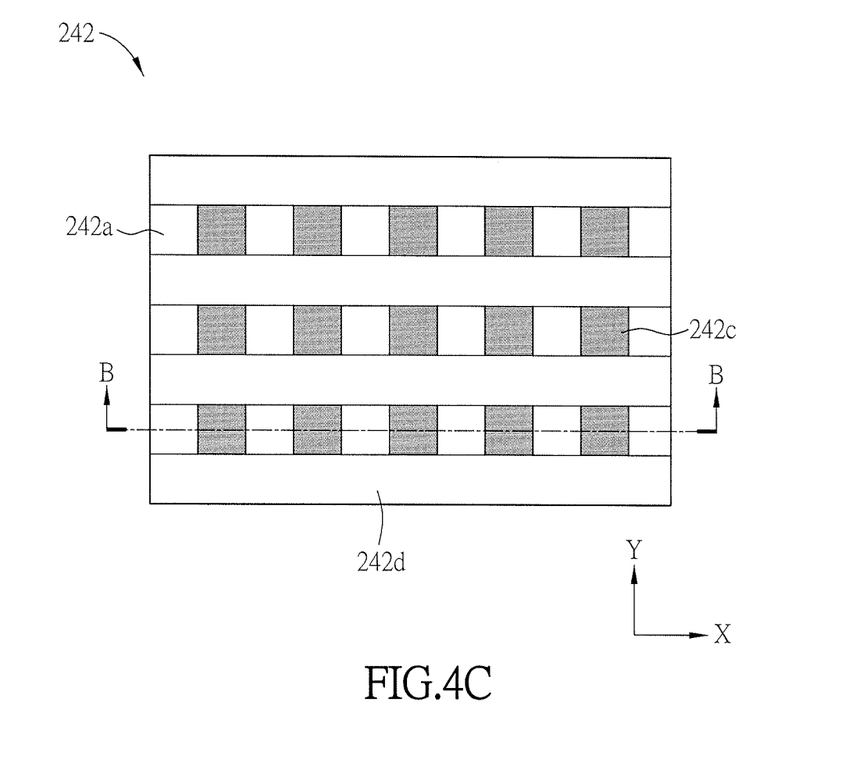
FIG. 4C is a schematic diagram showing the first polarizing element of the first relaying unit according to another embodiment.
Figure 4D:
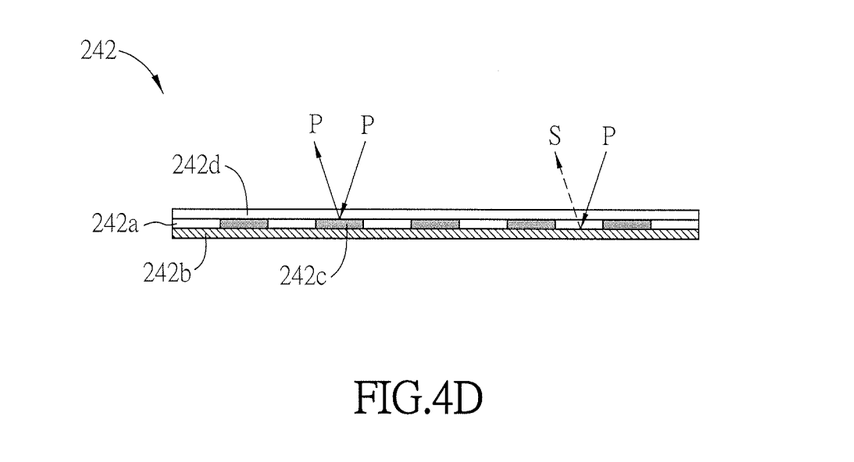
FIG. 4D is a sectional-drawing along cross-section line BB in FIG. 4C.

FIGS. 4C and 4D are respectively a perspective view and a lateral schematic diagram of the first polarizing element of the first relaying unit according to another embodiment. FIG. 4D is a sectional-drawing along cross-section line BB in FIG. 4C.

The first polarizing element 242 has a quarter-wave plate 242a, a first reflector 242b, a second reflector array 242c and a black stripe mask 242d. The quarter-wave plate 242a in the embodiment is rectangular plate and distinct from the stripe quarter-wave plate 142a of the previous embodiment. The black stripe mask 242d is disposed on one side of the quarter-wave plate 242a, and the first reflector 242b is disposed on the other side of the quarter-wave plate 242a. The second reflector array 242c is disposed in the quarter-wave plate 242a. The black stripe mask 242d together with the second reflector array 242c is arranged in the alignment of pixel (interlaced disposal). The difference from the previous embodiment is that the second reflector array 242c is collocated with a sheet of quarter-wave plate 242a of the embodiment replace the stripe quarter-wave plate 142a of the previous embodiment. The stripe quarter-wave plate 142a of the previous embodiment and the second reflector array 242c of the current embodiment both correspond to the pixel stripe of the image unit 11. The arrangements of both embodiments can split the light entering the first polarizing element 242 into a plurality of arrayed horizontally polarized light (p-polarized light) or vertically polarized light (s-polarized light). Because other applications and elements are similar to those of the previous embodiment, they are not repeated here.

The following description will illustrate the travel of the first light beam.

One portion of the first light beam entering the first relaying unit 14 enters the stripe quarter-wave plate 142a, and it is converted into vertically polarized light (s-polarized light) by the first polarizing element 142 and then reflected. The other portion which does not enter the stripe quarter-wave plate 142a is reflected and then exits (this portion light maintains horizontally polarized light (p-polarized light)). In detail, the light exiting from the first relaying unit 14 respectively at even columns and odd columns have different polarization directions.

Then, the first relaying unit 14 transmits the first light beam to the beam splitting unit 13, and the first light beam passes through and exits from the beam splitting unit 13.

Figure 5:
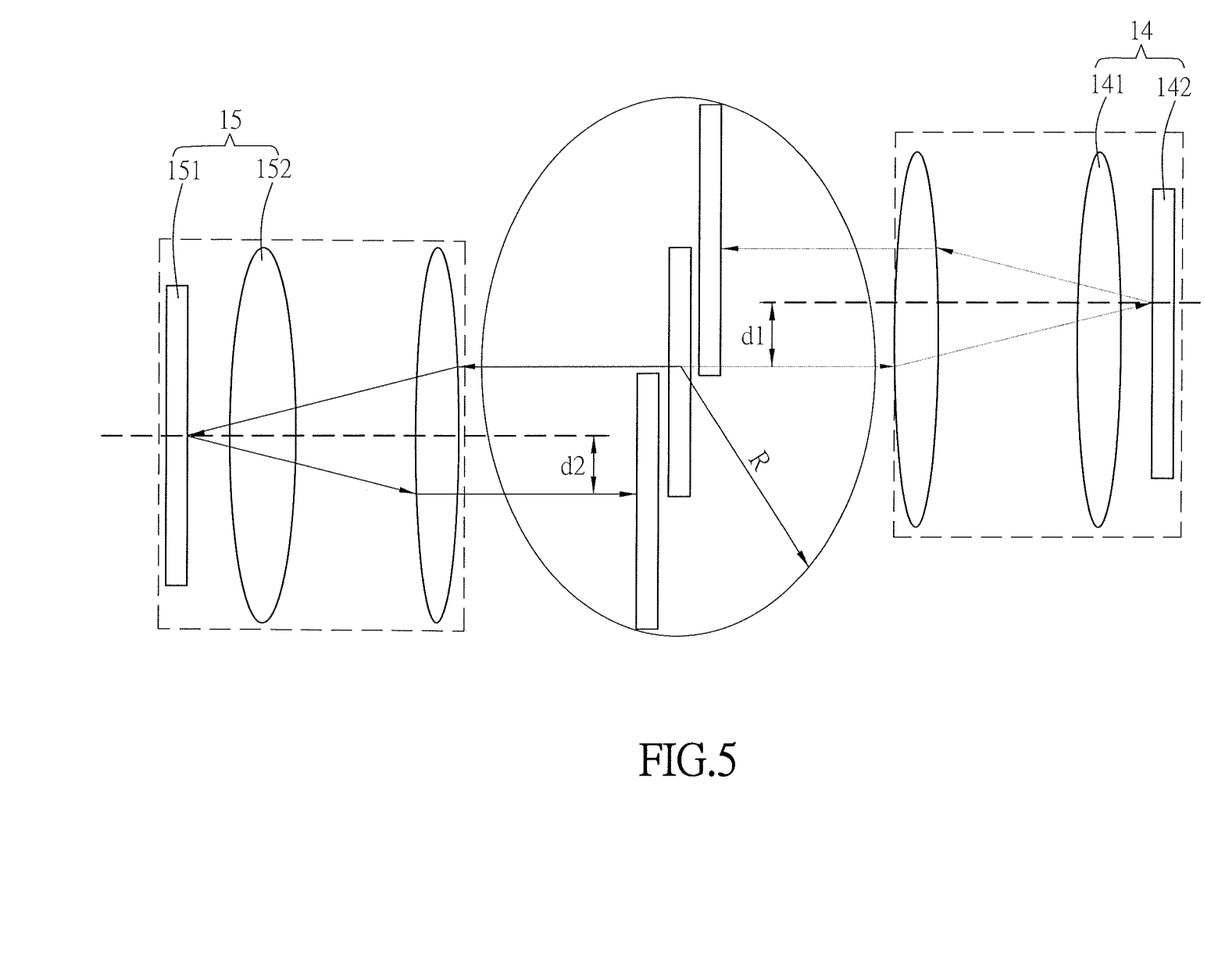
FIGS. 5 and 6 are schematic diagrams showing the first and the second relaying unit forming images.

Referring to FIG. 2 and FIG. 5, FIG. 5 is a schematic diagram showing the first and the second relaying unit forming image. It is clear from the figure that a first offset d1 exists between a first optical axis of the first light beam and the principal optical axis of the illumination module 1. In detail, the optical axis of the first light beam split by the beam splitting unit 13 is distinct from the principal optical axis. After passing the first relaying unit 14, the aperture position of the first light beam will offset.

The following description will illustrate the travel of the second light beam.

The second light beam entering the second relaying unit 15 is also converted into the condition that at even columns and odd columns respectively have different polarization directions. The second light beam exiting from the second relaying unit 15 enters the beam splitting unit 13 again, and it is reflected by the second reflective surface 133a of the beam splitting unit 13 and exits from the beam splitting unit 13.

It is clear from FIG. 2 and FIG. 5 that a second offset d2 exists between a second optical axis of the second light beam and the principal optical axis of the illumination module 1. In detail, the optical axis of the second light beam split by the beam splitting unit 13 is distinct from the principal optical axis. After passing the second relaying unit 15, the aperture position of the second light beam will also offset. The first offset d1 and the second offset d2 have opposite offset directions.

The illumination module has an aperture R, and the scalars of the offsets d1 and d2 of the first optical axis and the second optical axis are equal to the quarter of the aperture R. In the embodiment, when the aperture R is equal to or about 28 mm, the first optical axis and the second optical axis offset at about 7 mm from the principal optical axis. The scalars of the offsets of the first optical axis and the second optical axis are equivalent.

Figure 6:
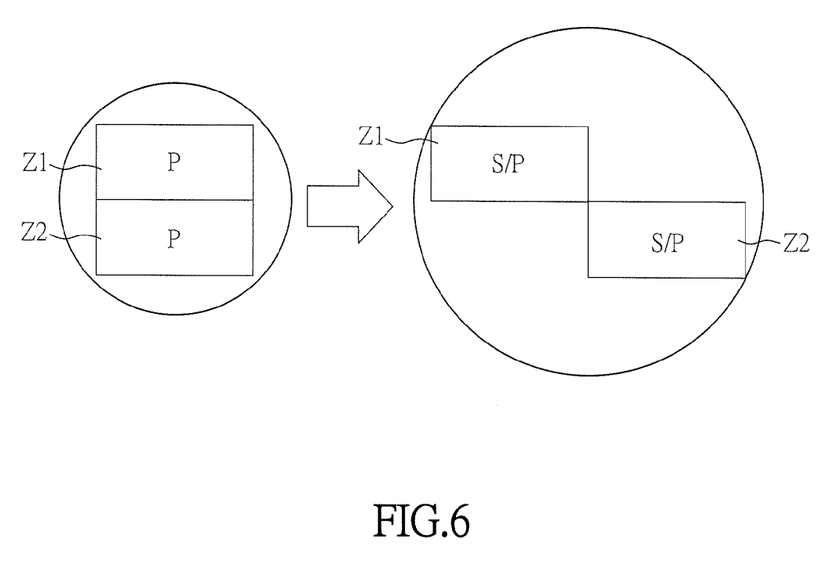

Referring to FIG. 6, it is a schematic diagram showing the first and the second relaying unit forming image. The diagram shows two sub-apertures Z1, Z2 disposed adjacently. The left of FIG. 6 illustrates the light forms an image on the condition that it does not pass through the beam splitting unit 13, the first relaying unit 14 and the second relaying unit 15 (the light is not offset yet). The right of FIG. 6 illustrates the offset apertures on the condition that the light passes through the beam splitting unit 13, the first relaying unit 14 and the second relaying unit 15. It is clear from the figure that the two sub-apertures Z1, Z2 can be separate by this configuration, and thus each of the sub-apertures Z1, Z2 which enter the display screen can form images at the adjacent fields of vision. Therefore, on the condition that it is not required for the illumination module 10 to enlarge the size of the image unit 11, the etendue of the illumination module 10 is increased double.

Figure 7:
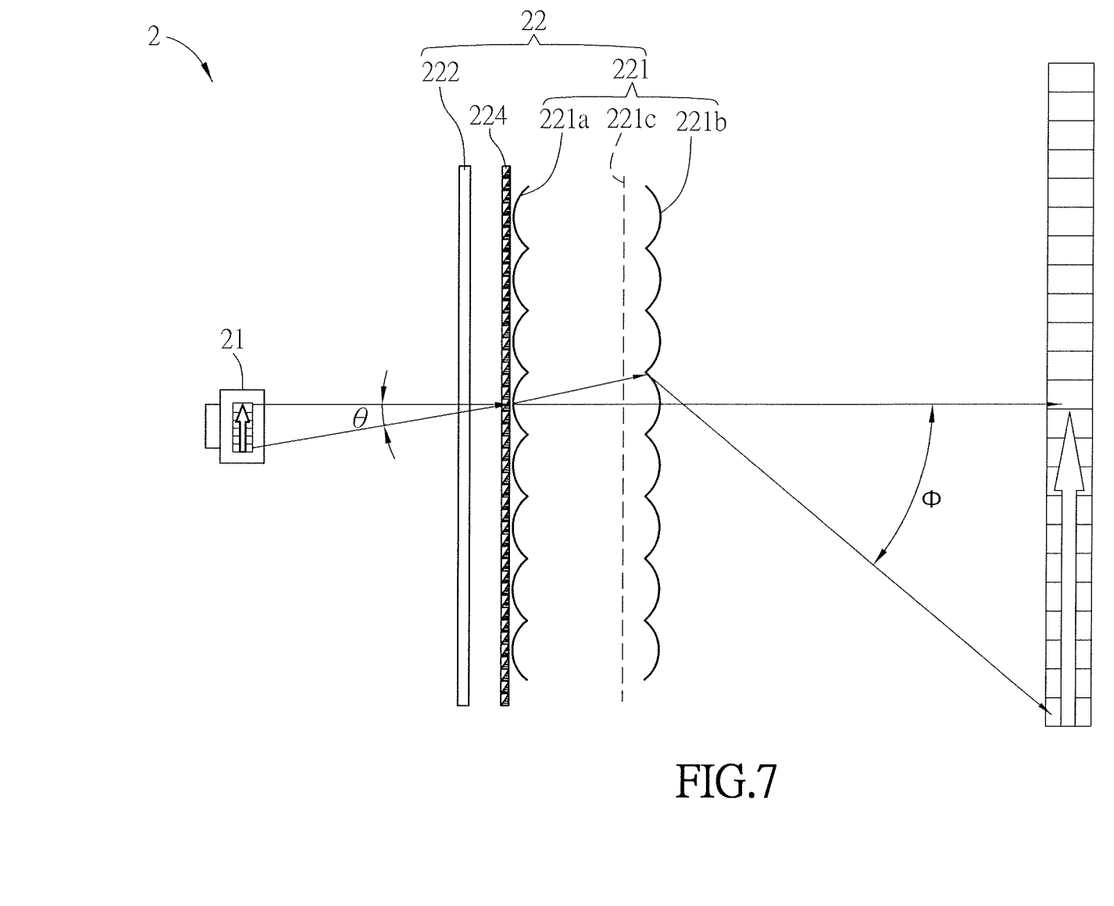
FIG. 7 is a schematic diagram showing a projection device according to one embodiment.
Figure 8:
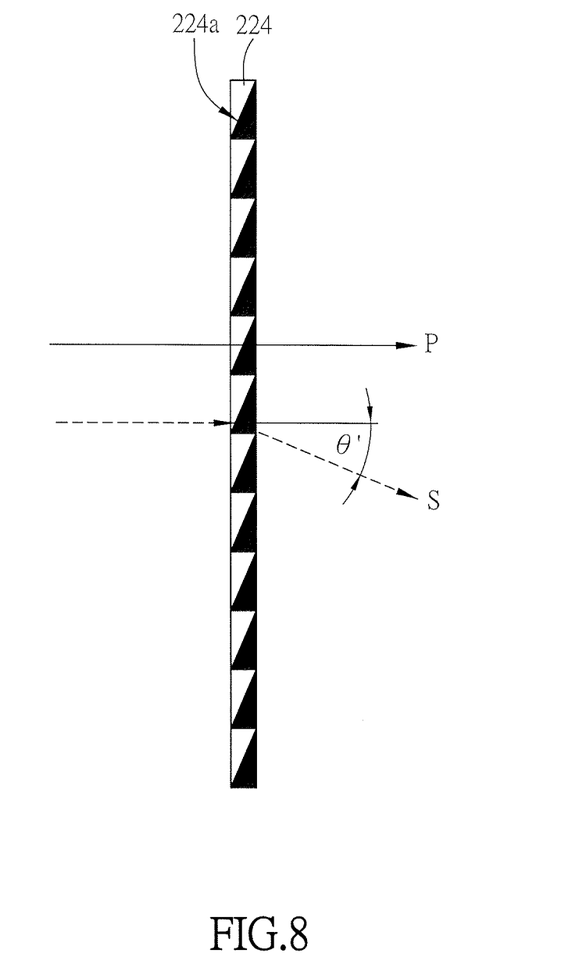
FIG. 8 is an enlarged schematic diagram showing the angle modulation element of the projection device of FIG. 7.

Then, referring to FIG. 7 and FIG. 8, FIG. 7 is a schematic diagram showing a projection device according to one embodiment, and FIG. 8 is an enlarged schematic diagram showing the angle modulation element of the projection device of FIG. 7.

The projection device 2 in the embodiment includes a display screen 22 and an illumination module 21.

The display screen 22 in the embodiment further includes a double-layer cylindrical lens 221. The double-layer cylindrical lens 221 has two cylindrical lens layers 221a, 221b and an omnidirectional diffuse plate 221c interposed between the cylindrical lens layers 221a, 221b. The light entering the double-layer cylindrical lens 221 is converged by the cylindrical lens layer 221a, and an image is produced on the omnidirectional diffuse plate 221c, and then an image is produced again on the fields of vision of the user through the cylindrical lens layer 221b. The lateral magnification of the double-layer cylindrical lens 221 is equal to the ratio of the radius of curvature of the lens layer 221a to that of the lens layer 221b. Namely, the angle of divergence θ of the incident light entering the double-layer cylindrical lens 221 can be enlarged to the angle of divergence Φ (referring to FIG. 7) by adjusting the ratio of the radius of curvature. For example, the ratio of the radius of curvature in the embodiment is equal to or about 30, and thus the enlarged angle of divergence Φ is about 30 times of the angle of divergence θ.

Particularly for easy understanding, the distance, size and detail characteristics of each element on the drawing have been exaggerated, and thus the dimension of the drawing should not be limiting conditions for the present invention.

Furthermore, the cylindrical lens layers 221a, 221b can be made by transparent material of high refractive index, such as ultraviolet curing resin, thermosetting resin or plastic. The shapes of the first lens and the second lens can be circular, oval, triangular or square, etc.

The display screen 22 in the embodiment further includes a uniform unit (not shown in the figure) to uniform the light to form a strip light source and transmit to the observer side. The uniform unit (not shown in the figure) in the embodiment can be, for example but not limited to, an integration rod or a light tunnel.

The display screen 22 in the embodiment further includes a collimating unit 222 disposed between the double-layer cylindrical lens 221 and the illumination module 21. The collimating unit 222 makes the incident light collimated and parallel which then enters the double-layer cylindrical lens 221. Besides, the collimating unit 222 in the embodiment is for example a linear Fresnel lens.

An angle modulation element 224 is made by birefringence material, and the angle modulation element 224 has a plurality of refractive surfaces 224a. For example, a plurality of serrated micro structures are formed by segmenting a surface of a plastic substrate, and then the micro structures are filled up with birefringence material to form the angle modulation element 224 as shown in FIG. 8. The vertically polarized light (s-polarized light) passing through the refractive surface 224a will be refracted, and the incident light which is horizontally polarized light (p-polarized light) will directly pass through the refractive surface 224a (without deflection). This design results in that another emergent angle (with respect to the incident angle) is formed from the emergent angle of the light which exits from the angle modulation element 224.

In detail, when the incident angle of the light provided by the illumination module 21 is θ, this incident angle can be increased to θ' after the light passes through the angle modulation element 224. At this moment, the incident angle received by the double-layer cylindrical lens 221 is θ' instead of θ. Finally the angle of divergence Φ forming image at the observer side is also increased. As to this screen design, the etendue can be increased by disposing the angle modulation element 224 on the display screen 22 on the condition that the design of the illumination module 21 is not modified.

However, the illumination module 21 in the embodiment can utility the previous illumination module but it is not limited to the previous illumination module. The etendue can be increased double if the illumination module utilizes the previous illumination module. Then the etendue can be increased double again by the angle modulation element 224 at the display screen 22. Thus, the etendue of the projection device can be enlarged quadruple on the condition that the image area of the image unit is not necessary to enlarge. The detail structure and application of the previous illumination module 21 are not repeated here again.

Figure 9:
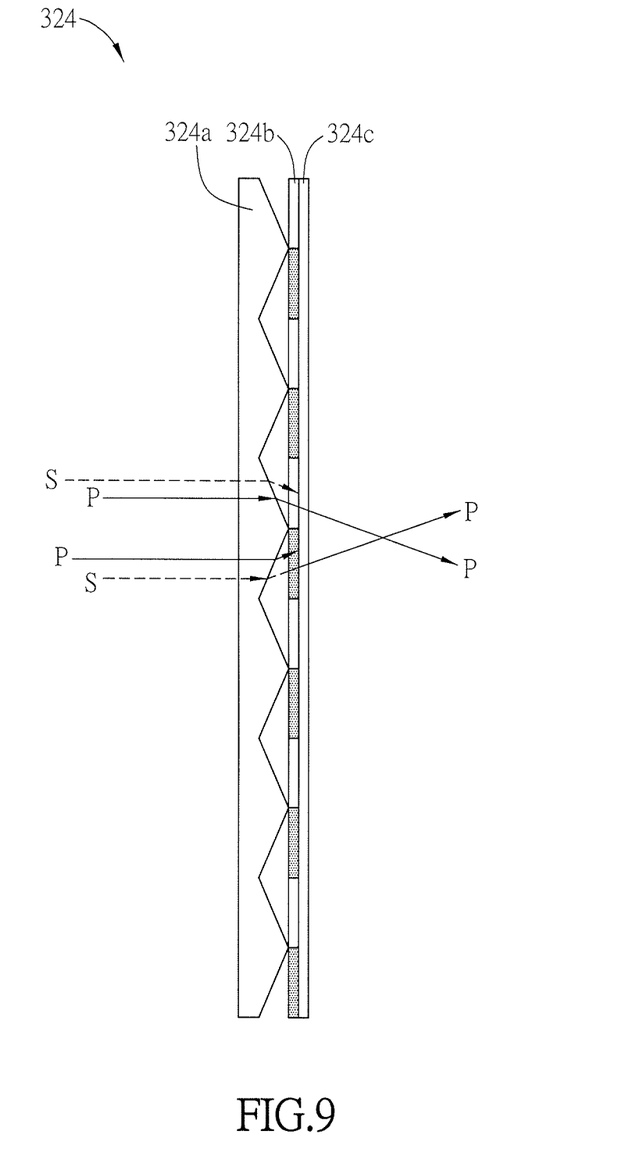
FIG. 9 is an enlarged schematic diagram showing the angle modulation element of the projection device of FIG. 7 according to another embodiment.

Then referring to FIG. 9, FIG. 9 is an enlarged schematic diagram showing the angle modulation element of the projection device of FIG. 7 according to another embodiment.

Referring to FIG. 9, compared to the angle modulation element 224 of FIG. 8, the angle modulation element 324 in the embodiment includes a serrated prism 324a, stripe half-wave plates 324b and a polarizer 324c. The polarizer 324c allows the horizontally polarized light (p-polarized light) to pass through.

The light entering the angle modulation element 324 includes the horizontally polarized light (p-polarized light) and the vertically polarized light (s-polarized light). The serrated prism 324a has a plurality of refractive surfaces, and the adjacent ones of the refractive surfaces have different angles. The serrated prism 324a is aligned to the stripe half-wave plates 324b. In detail, the refractive surfaces of the serrated prism 324a are disposed correspondingly to each of the stripe half-wave plates 324b. Among a portion light which passes through the serrated prism 324a and enters the stripe half-wave plates 324b, the vertically polarized light (s-polarized light) is converted into the horizontally polarized light (p-polarized light), and the horizontally polarized light (p-polarized light) is converted into the vertically polarized light (s-polarized light). Alternatively, among a portion light which passes through the serrated prism 324a but does not enter the stripe half-wave plates 324b, the vertically polarized light (s-polarized light) and the horizontally polarized light (p-polarized light) still hold originally. Then the polarizer 324c blocks the vertically polarized light (s-polarized light), and thus the light exiting from the angle modulation element 324 is all horizontally polarized light (p-polarized light). However, by the serrated prism 324a, an angle of emergence of the incident light exiting from the angle modulation element 324 becomes two angles of emergence (with respect to the angle of incidence). The horizontally polarized light (p-polarized light) turns into a forward angle and the vertically polarized light (s-polarized light) turns into another reverse angle.

Because the function of the angle modulation element 324 and the collocation with other elements are similar to those of the previous embodiment, they are not repeated here.

As mentioned above, the illumination module provided by the embodiments can split the light into the first light beam and the second light beam by disposing the first reflective surface on the transmitting surface of the beam splitting unit, and the first light beam and the second light beam respectively enter the first relaying unit and the second relaying unit. The optical axes of the first light beam entering the first relaying unit and the second light beam entering the second relaying unit each has an offset with respect to the principal optical axis. Thus, the angle of the resolvable light exiting from the illumination module is raised (etendue is increased). On the condition that the image unit is not modified and an additional image unit is not required, the quantity of the resolvable fields of vision can be increased.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An illumination module for a display device, wherein the illumination module has a principal optical axis, comprising:
   a light source providing a light;
   an image unit;
   a beam splitting unit having a transmitting surface, a first reflective surface and a second reflective surface, wherein the first reflective surface and the second reflective surface are disposed correspondingly to each other;
   a first relaying unit; and
   a second relaying unit;
   wherein the light passes through the image unit and the beam splitting unit in sequence, one portion of the light forms a first light beam, one portion of the light forms a second light beam, the first light beam is reflected into the first relaying unit by the first reflective surface, the first relaying unit transmits the first light beam to the beam splitting unit, and the first light beam passes through and exits from the beam splitting unit, wherein the second light beam passes through the beam splitting unit and enters the second relaying unit, the second relaying unit transmits the second light beam to the second reflective surface of the beam splitting unit, and the second light beam is reflected by the second reflective surface and exits from the beam splitting unit, wherein a first offset exists between a first optical axis of the first light beam and the principal optical axis, a second offset exists between a second optical axis of the second light beam and the principal optical axis, and the first offset and the second offset have equivalent scalars and opposite offset directions.

2. The illumination module of claim 1, wherein the illumination module has an aperture, and the scalars of the first offset and the second offset are equal to the quarter of the aperture.

3. The illumination module of claim 1, wherein the image unit is a digital micromirror device or a LCD device, and the light source is a laser light source or a laser array.

4. The illumination module of claim 1, further comprising a polarizing unit, wherein after exiting from the image unit, the light enters the polarizing unit to form horizontally polarized light or vertically polarized light.

5. The illumination module of claim 1, wherein the first relaying unit has a first polarizing element, the first polarizing element has a black stripe mask, a plurality of stripe quarter-wave plates and a reflector, the stripe quarter-wave plates are disposed on the reflector, and the black stripe mask is disposed orthogonally on the stripe quarter-wave plates.

6. The illumination module of claim 1, wherein the first relaying unit has a first polarizing element, the first polarizing element has a black stripe mask, a quarter-wave plate and a reflector, the quarter-wave plate is disposed on the reflector, and the black stripe mask is disposed on the quarter-wave plate.

7. The illumination module of claim 1, further comprising an optical scan element, wherein the light is transmitted to the image unit by the optical scan element, and the optical scan element drives a reflective surface of the optical scan element to deflect according to different time sequences to form a plurality of different images.

8. The illumination module of claim 7, wherein the optical scan element is a voice coil motor, polygon mirror or MEMS (microelectromechanical systems) lens.

9. The illumination module of claim 1, wherein the beam splitting unit further comprises a first prism, a second prism and a third prism, the first prism forms the transmitting surface, the second prism and the third prism are disposed on the transmitting surface of the first prism, the first reflective surface is disposed on one side of the second prism opposite the third prism, and the second reflective surface is disposed on one side of the third prism opposite the second prism.

10. A display device, comprising:
a display screen;
an illumination module having a principal optical axis, comprising:
a light source providing a light;
an image unit;
a beam splitting unit having a transmitting surface, a first reflective surface and a second reflective surface, wherein the first reflective surface and the second reflective surface are disposed correspondingly to each other;
a first relaying unit; and
a second relaying unit;
wherein the light passes through the image unit and the beam splitting unit in sequence, one portion of the light forms a first light beam, one portion of the light forms a second light beam, the first light beam is reflected into the first relaying unit by the first reflective surface, and the first relaying unit transmits the first light beam to the beam splitting unit, wherein the second light beam passes through the beam splitting unit and enters the second relaying unit, the second relaying unit transmits the second light beam to the second reflective surface of the beam splitting unit, and the second light beam is reflected by the second reflective surface and exits from the beam splitting unit, wherein a first offset exists between a first optical axis of the first light beam and the principal optical axis, a second offset exists between a second optical axis of the second light beam and the principal optical axis, the first offset and the second offset have equivalent scalars, and the first light beam and the second light beam are transmitted to the display screen by the beam splitting unit.

11. The display device of claim 10, wherein the illumination module has an aperture, and the scalars of the first offset and the second offset are equal to the quarter of the aperture.

12. The display device of claim 10, wherein the image unit is a digital micromirror device or a LCD device, and the light source is a laser light source or a laser array.

13. The display device claim 10, wherein the illumination module further comprises a polarizing unit, wherein after exiting from the image unit, the light enters the polarizing unit to form horizontally polarized light or vertically polarized light.

14. The display device of claim 10, wherein the first relaying unit of the illumination module has a first polarizing element, the first polarizing element has a black stripe mask, a plurality of stripe quarter-wave plates and a reflector, the stripe quarter-wave plates are disposed on the reflector, and the black stripe mask is disposed orthogonally on the stripe quarter-wave plates.

15. The display device of claim 10, wherein the first relaying unit of the illumination module has a first polarizing element, the first polarizing element has a black stripe mask, a quarter-wave plate and a reflector, the quarter-wave plate is disposed on the reflector, and the black stripe mask is disposed on the quarter-wave plate.

16. The display device of claim 10, wherein the illumination module further comprises an optical scan element, wherein the light is transmitted to the image unit by the optical scan element, and the optical scan element deflects according to different time sequences to form a plurality of different images.

17. The display device of claim 10, wherein the beam splitting unit further comprises a first prism, a second prism and a third prism, the first prism forms the transmitting surface, the second prism and the third prism are disposed on the transmitting surface of the first prism, the first reflective surface is disposed on one side of the second prism opposite the third prism, and the second reflective surface is disposed on one side of the third prism opposite the second prism.

18. The display device of claim 10, wherein the display screen comprises a double-layer cylindrical lens, wherein the double-layer cylindrical lens has two cylindrical lens layers and an omnidirectional diffuse plate interposed between the cylindrical lens layers.

19. The display device of claim 10, further comprising an angle modulation element, wherein the angle modulation element has a plurality of refractive surfaces made by birefringence material.

20. The display device of claim 10, further comprising an angle modulation element, wherein the angle modulation element has a polarizer, a plurality of stripe half-wave plates and a serrated prism, the serrated prism has a plurality of refractive surfaces, and each of the refractive surfaces is disposed correspondingly to each of the stripe half-wave plates.

* * * * *